United States Patent [19]

Matte

[11] 4,180,226
[45] Dec. 25, 1979

[54] ELECTRICAL OUTLET BOX SUPPORT

[76] Inventor: Jacques R. Matte, 187 Rue Thompson, Gatineau, Quebec, Canada, J8P 6L9

[21] Appl. No.: 902,644

[22] Filed: May 4, 1978

[51] Int. Cl.² ............................................. G12B 9/00
[52] U.S. Cl. .................................. 248/27.1; 220/3.9; 248/DIG. 6; 248/343
[58] Field of Search ................. 248/27.1, 205 R, 342, 248/343, DIG. 6; 174/59, 88; 220/3.7, 3.9, 3.92, 3.5, 3.6

[56] References Cited

U.S. PATENT DOCUMENTS

| | | | |
|---|---|---|---|
| 2,286,898 | 6/1942 | Cover | 248/DIG. 6 |
| 2,586,728 | 2/1952 | Shepard | 220/3.6 UX |
| 2,614,785 | 10/1952 | Versen | 248/343 |
| 3,268,189 | 8/1966 | Ducharme | 248/343 |
| 3,362,667 | 1/1968 | Ginsburg | 248/205 R |
| 3,759,473 | 9/1973 | Sosaya | 248/27.1 X |
| 3,884,441 | 5/1975 | Barry | 248/27.1 X |
| 3,963,204 | 6/1976 | Liss | 248/27.1 |

FOREIGN PATENT DOCUMENTS 529932  2/1955  Italy .......................................... 174/58

*Primary Examiner*—J. Franklin Foss
*Attorney, Agent, or Firm*—W. John McClenahan

[57] ABSTRACT

A support for mounting an electrical outlet box in an aperture in a building panel, said support comprising a U-shaped yoke having a base portion, a pair of legs substantially normal to the base portion and a support foot extending outwardly from each leg substantially parallel to the base portion and adapted to overlie an area of the front of the building panel adjacent the aperture when the yoke is inserted in the aperture, each leg having at least one aperture intermediate the base portion and the foot; and a clamping member for association with each leg of the yoke, each clamping member having a support surface adapted to overlie an area of the back of the building panel opposite the area of the front of the building panel to be overlaid by the foot of the associated leg, a tab member extending from said support surface and adapted to interconnect the clamping member with said at least one aperture of the associated leg, and a clamping arm extending from the support surface on each side of the tab member, each arm being bendable to a first position extending out of the aperture in the building panel in a direction substantially normal to the front of the building panel and bendable to a second position, when an electrical outlet box is positioned in the aperture in the building panel, over the edge of the electrical outlet box to secure the electrical outlet box in position.

6 Claims, 7 Drawing Figures

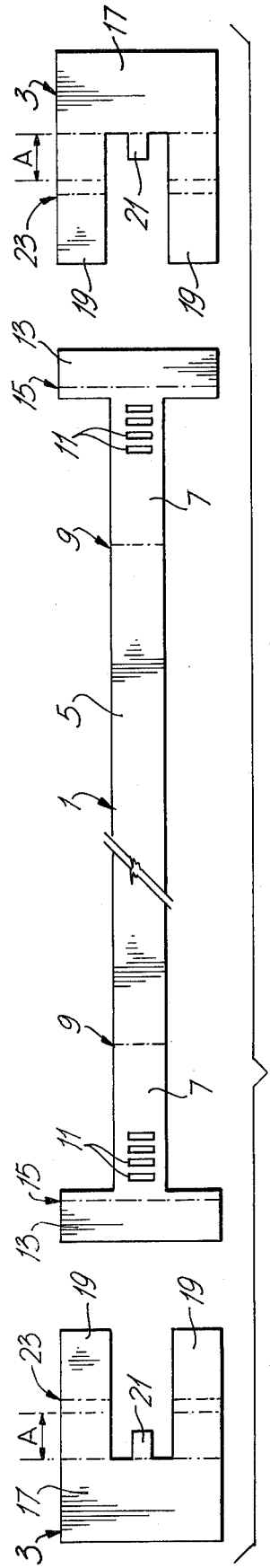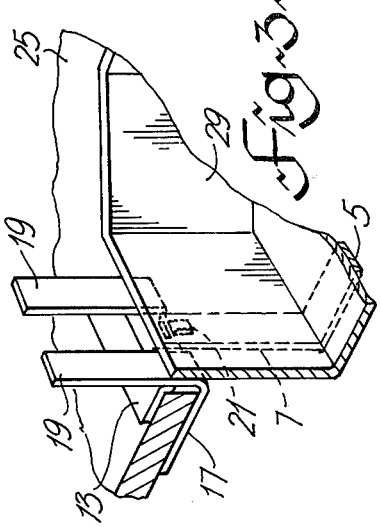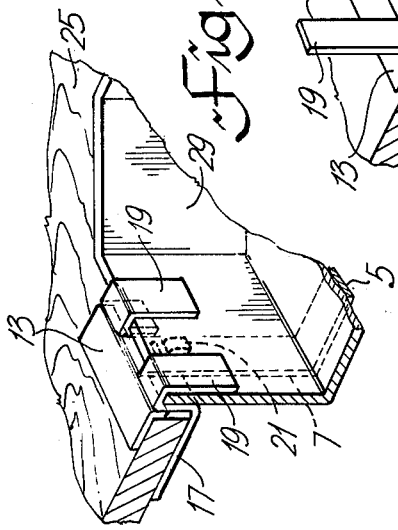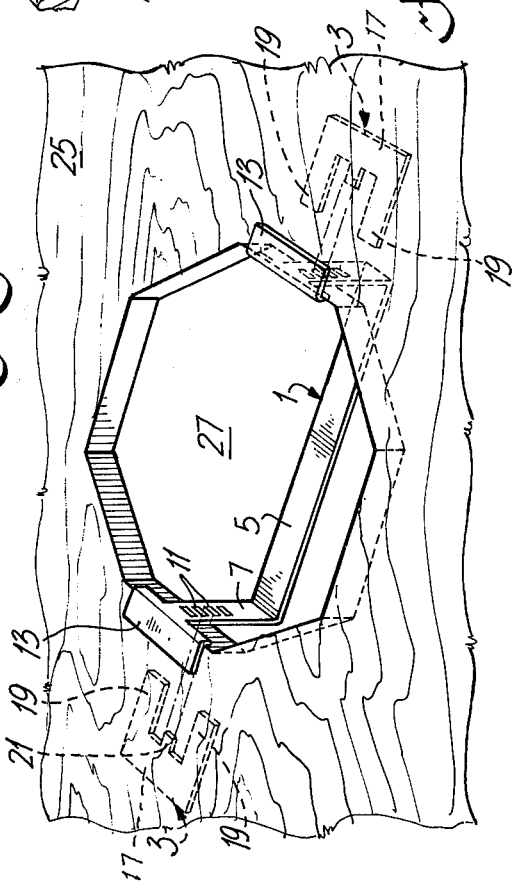

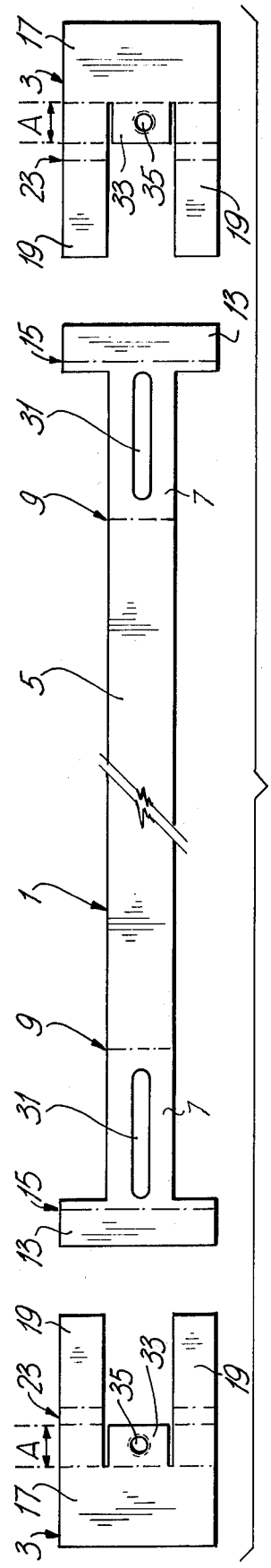
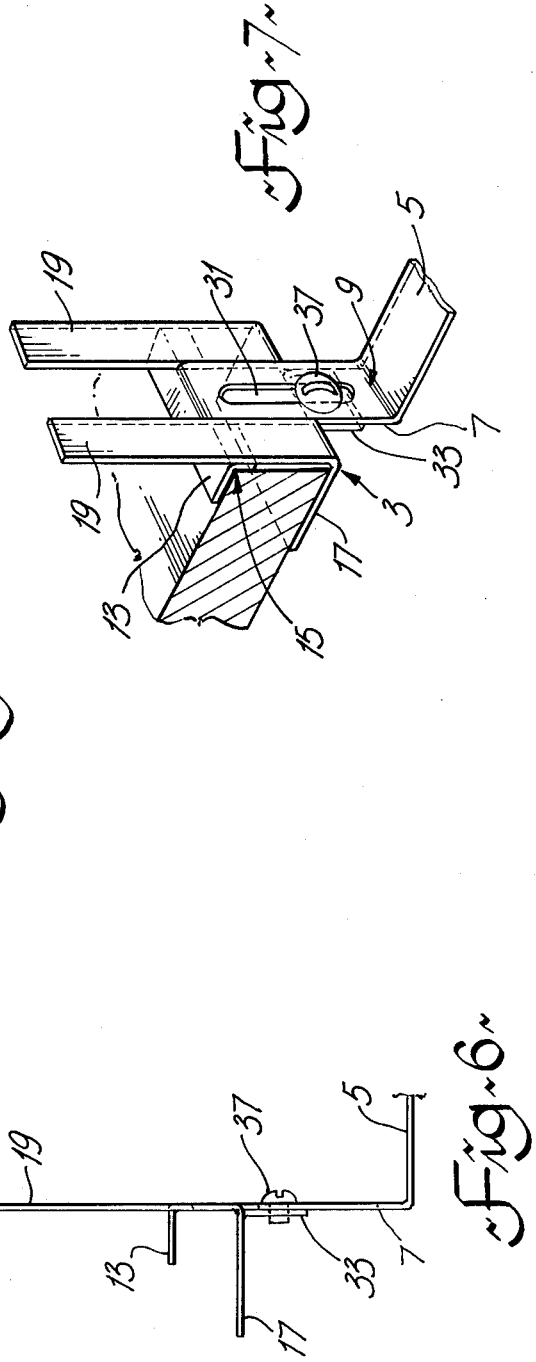

ELECTRICAL OUTLET BOX SUPPORT

BACKGROUND OF THE INVENTION

1. Field of the Invention

The present invention relates to a support for mounting an electrical outlet box in an aperture in a building panel.

More specifically, the present invention relates to a support for mounting an electrical outlet box in an aperture in a building panel, said support comprising: a U-shaped yoke having a base portion, a pair of legs substantially normal to the base portion and a support foot extending outwardly from each leg substantially parallel to the base portion and adapted to overlie an area of the front of the building panel adjacent the aperture when the yoke is inserted in the aperture, each leg having at least one aperture intermediate the base portion and the foot; and a clamping member for association with each leg of the yoke, each clamping member having a support surface adapted to overlie an area of the back of the building panel opposite the area of the front of the building panel to be overlaid by the foot of the associated leg, a tab member extending from said support surface and adapted to interconnect the clamping member with said at least one aperture of the associated leg, and a clamping arm extending from the support surface on each side of the tab member, each arm being bendable to a first position extending out of the aperture in the building panel in a direction substantially normal to the front of the building panel and bendable to a second position when an electrical outlet box is positioned in the aperture in the building panel, over the edge of the electrical outlet box to secure the electrical outlet box in position.

The support avoids the necessity of attaching the electrical outlet box to building studs or joists, and provides for positive retention of the electrical outlet box in the aperture in the building panel over a range of building panel thicknesses.

The invention pertains to subject matter generally classifiable in United States Class 220 (Metallic Receptacles), Subclass 3.6 (Outlet or Junction Box Type; Wall, Floor, or Panel Mounted; in Opening; Opposed Engaging Means).

2. Description of the Prior Art

Prior art structures for mounting electrical boxes, specifically switch boxes, in an aperture in a building panel by means of support members engaging the back surface of the building panel and having arms which can be bent over the edges of the switch box are exemplified by Hussar U.S. Pat. No. 1,816,584 issued July 28, 1931 and Judd et al U.S. Pat. No. 1,820,309 issued Aug. 25, 1931.

In both the Hussar and Judd et al patents the support members prevent outward displacement of the switch box; inward displacement of the switch box is prevented by means of a pair of ear members, integral to the switch box, which overlie the front of the building panel adjacent the aperture. The combination of the support members and switch box ear members provides positive retention of the switch box in the aperture.

The present invention is concerned with a support for electrical outlet boxes, rather than switch boxes, i.e. structures which generally have an octagonal face and lack integral ear members which prevent inward displacement of the electrical outlet box into the aperture in which it is being installed. The electrical outlet box support of the present invention provides for positive retention of the box in an aperture in a building panel, the support itself preventing either inward or outward displacement of the box.

SUMMARY OF THE INVENTION

It is an object of the present invention to provide an electrical outlet box support for positively securing an electrical outlet box in an aperture in a building panel.

In one particular aspect the present invention provides a support for mounting an electrical outlet box in an aperture in a building panel, said support comprising: a U-shaped yoke having a base portion, a pair of legs substantially normal to the base portion and a support foot extending outwardly from each leg substantially parallel to the base portion and adapted to overlie an area of the front of the building panel adjacent the aperture when yoke is inserted in the aperture, each leg having at least one aperture intermediate the base portion and the foot; and a clamping member for association with each leg of the yoke, each clamping member having a support surface adapted to overlie an area of the back of the building panel opposite the area of the front of the building panel to be overlaid by the foot of the associated leg, a tab member extending from said support surface and adapted to interconnect the clamping member with said at least one aperture of the associated leg, and a clamping arm extending from the support surface on each side of the tab member, each arm being bendable to a first position extending out of the aperture in the building panel in a direction substantially normal to the front of the building panel and bendable to a second position when an electrical outlet box is positioned in the aperture in the building panel, over the edge of the electrical outlet box to secure the electrical outlet box in position.

BRIEF DESCRIPTION OF THE DRAWINGS

In drawings which illustrate aspects of the present invention:

FIG. 1 is a plan view of the components, in planar form, of one embodiment of the electrical outlet box support of the present invention;

FIG. 2 is a perspective view, partially exploded, of the embodiment of the electrical outlet box support employing the components of FIG. 1;

FIG. 3 is a perspective view, partially in section and partially broken, illustrating an electrical outlet box in an intermediate stage of installation utilizing the electrical outlet box support of FIG. 2;

FIG. 4 is a perspective view, partially in section and partially broken, illustrating an electrical outlet box installed utilizing the electrical outlet box support of FIG. 2;

FIG. 5 is a plan view of the major components, in planar form, of a further embodiment of the electrical outlet box support of the present invention;

FIG. 6 is a side elevation, partially broken, illustrating the support members of the embodiment of FIG. 5 interconnected, following bending; and FIG. 7 is a perspective view, partially in section and partially broken, illustrating the assembly of FIG. 6 installed on a section of building panel.

DESCRIPTION OF THE PREFERRED EMBODIMENTS

Referring now to FIG. 1, there is illustrated a yoke 1 and pair of clamping members 3, the components all being shown in a planar form as would be obtained by stamping the components from metal.

Yoke 1 has a base portion 5, a pair of legs 7 which are provided with an array of slots 11, and a pair of feet 13.

The clamping members 3 each have a support surface 17, a pair of arms 19 and a tab member 21.

The yoke 1 is bent along lines 9 and 15 to assume the shape illustrated in FIG. 2.

As may be seen from FIG. 2, feet 12 of yoke 1 overlie building panel 25 when yoke 1 is inserted in an appropriately shaped aperture 27 cut in building panel 25. As may also be seen from FIG. 2, the clamping members 3 are adapted to overlie the back of building panel 25, in opposition to feet 13, and tab members 21 protrude through appropriate slots of the array of slots 11, the slots chosen being dependent upon the thickness of building panel 25.

The tab members 21 following insertion through the appropriate slots 11, are then bent over, as shown in FIGS. 3 and 4, and the arms 19 bent into the position illustrated in FIG. 3, whereupon an electrical outlet box 29 is inserted in the aperture in building panel 25. Following the insertion of the electrical outlet box 29, arms 19 are bent over the edges of the electrical outlet box 29 as illustrated in FIG. 4 to securely position the box.

During the installation of an electrical outlet box utilizing the support of the present invention, the clamping members 3 are accordingly bent to first interconnect with yoke 1, by means of the tab members 21, then to prepare the support for the reception of an electrical outlet box, by bending arms 19 outwardly to extend out of the aperture, and then to secure the electrical outlet box 29, by means of arms 19. The arms 19 of the clamping members 3 thus prevent outward displacement of the electrical outlet box 29 while the base portion 5 of yoke 1 prevents inward displacement of the electrical outlet box 29.

As a result of the initial bending of the arms 19 of the clamping members 3 during the installation of an electrical outlet box 29, the portions A of arms 19, as illustrated in FIG. 1, will essentially abut edges of the building panel 25 about the aperture 27. Following the insertion of an electrical outlet box 29 the arms 19 are bent essentially along the lines 23, also illustrated in FIG. 1, and the A lines adjacent the lines 23 to secure the electrical outlet box 29. It will of course be understood that the length of portions A and hence the positioning of lines 23 are both dependent upon the thickness of the building panel 25 in which an electrical outlet box 29 is being installed.

FIGS. 5 and 7 illustrate an alternate embodiment of the electrical outlet box support of the present invention.

As may be readily seen from FIG. 5, the yoke 1 of the alternate embodiment differs from the yoke 1 of the embodiment of FIG. 1 only by the provision of a longitudinally extending slot 31 in each leg 7 in place of the counterpart array of slots 11.

The clamping members 3 of the alternate embodiment differ from the clamping members 3 of the embodiment of FIG. 1 only in terms of a tab member 33 which is provided with a bore 35.

The major components of the embodiment of FIG. 5, as in the case of FIG. 1, are shown in a planar form as would be obtained by stamping the components from metal.

The yoke 1 of the alternate embodiment is bent to the same configuration as the yoke illustrated in FIG. 2.

The tab members 33 of the clamping members 3 of the alternate embodiment are bent to be essentially normal to support surface 17, and the arms 19 of the clamping members 3 bent so as to be substantially 180° to the tab members 33.

Each clamping member 3 is interconnected to a leg 7 of the yoke, as shown in FIG. 6, by means of a screw 37 passing through the longitudinally extending slot 31 of leg 7 and into bore 35. Sheet metal screws can be utilized, if desired.

The alternate embodiment is installed in a building panel and accomodates an electrical outlet box in the same manner as the embodiment of FIGS. 1 to 4, with the exception that the clamping members 3 are interconnected to the yoke legs 7 by means of screws 37, rather than by the bending over of tab members 21 following insertion through slots of the arrays of slots 11.

As will be readily apparent, the dimensions of yoke 1, in particular the respective lengths of base portion 5 and legs 7, are essentially dictated by the width and depth of the particular size of electrical outlet box to be installed. Thus, a range of supports of different sizes can be manufactured to accomodate different sizes of electrical outlet boxes.

The supports of the present invention can readily be stamped from metal and can either be bent as a part of the manufacturing operation or can be bent on the job site by the electrician. In either case the metal employed, and its thickness, should be such as to facilitate bending and yet provide sufficient mechanical strength.

Various modifications and variations, falling within the true broad spirit and scope of the invention, will be obvious to those skilled in the art.

I claim:

1. A support for mounting an electrical outlet box in an aperture in a building panel, said support comprising: a U-shaped yoke having a base portion, a pair of legs substantially normal to the base portion and a support foot extending outwardly from each leg substantially parallel to the base portion and adapted to overlie an area of the front of the building panel adjacent the aperture when the yoke is inserted in the aperture, each leg having an array of slots intermediate the base portion and the foot; and a clamping member for association with each leg of the yoke, each clamping member having a support surface adapted to overlie an area of the back of the building panel opposite the area of the front of the building panel to be overlaid by the foot of the associated leg, a tab member extending from said support surface and adapted to extend through a slot of the array of slots of the associated leg of the yoke and then be bent over to interconnect the clamping member to the associated leg of the yoke, and a clamping arm extending from the support surface on each side of the tab member, each arm being bendable to a first position extending out of the aperture in the building panel in a direction substantially normal to the front of the building panel and bendable to a second position when an electrical outlet box is positioned in the aperture in the building panel, over the edge of the electrical outlet box to secure the electrical outlet box in position.

2. The electrical outlet box support of claim 1 wherein the yoke and clamping members are stamped from metal.

3. The electrical outlet box support of claim 1 wherein the yoke and clamping members are stamped from metal as planar blanks and then bent to the desired configurations.

4. A support for mounting an electrical outlet box in an aperture in a building panel, said support comprising: a U-shaped yoke having a base portion, a pair of legs substantially normal to the base portion and a support foot extending outwardly from each leg substantially parallel to the base portion and adapted to overlie an area of the front of the building panel adjacent the aperture when the yoke is inserted in the aperture, each leg having a longitudinally extending slot intermediate the base portion and the foot; and a clamping member for association with each leg of the yoke, each clamping member having a support surface adapted to overlie an area of the back of the building panel opposite the area of the front of the building panel to be overlaid by the foot of the associated leg, a tab member extending from said support surface substantially normal to the support surface and interconnected to the associated leg of the yoke by a screw passing through the longitudinally extending slot of the associated leg and into the tab member, and a clamping arm extending from the support surface on each side of the tab member, each arm being bendable to a first position extending out of the aperture in the building panel in a direction substantially normal to the front of the building panel and bendable to a second position when an electrical outlet box is positioned in the aperture in the building panel, over the edge of the electrical outlet box to secure the electrical outlet box in position.

5. The electrical outlet box support of claim 4, wherein the yoke and clamping members are stamped from metal.

6. The electrical outlet box support of claim 4 wherein the yoke and clamping members are stamped from metal as planar blanks and then bent to the desired configurations.

* * * * *